(12) United States Patent
Cunningham et al.

(10) Patent No.: US 10,086,840 B2
(45) Date of Patent: Oct. 2, 2018

(54) METHODS AND SYSTEM FOR OPERATING A VEHICLE

(71) Applicant: Ford Global Technologies, LLC, Dearborn, MI (US)

(72) Inventors: Ralph Wayne Cunningham, Milan, MI (US); Zhengyu Dai, Canton, MI (US); Yang Xu, Dearborn, MI (US); Sathish Atluri, Canton, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/224,244

(22) Filed: Jul. 29, 2016

(65) Prior Publication Data

US 2018/0029598 A1  Feb. 1, 2018

(51) Int. Cl.
| | |
|---|---|
| *B60W 30/188* | (2012.01) |
| *F16H 61/02* | (2006.01) |
| *F16H 63/40* | (2006.01) |
| *F16H 59/44* | (2006.01) |
| *F16H 59/54* | (2006.01) |
| *F16H 59/60* | (2006.01) |
| *B60W 10/11* | (2012.01) |
| *B60W 10/06* | (2006.01) |

(52) U.S. Cl.
CPC ......... *B60W 30/188* (2013.01); *B60W 10/06* (2013.01); *B60W 10/11* (2013.01); *F16H 59/44* (2013.01); *F16H 59/54* (2013.01); *F16H 59/60* (2013.01); *F16H 61/0204* (2013.01); *F16H 63/40* (2013.01); *B60W 2520/10* (2013.01); *B60W 2540/12* (2013.01); *B60W 2540/16* (2013.01); *B60W 2550/10* (2013.01); *B60W 2710/0605* (2013.01); *B60W 2710/0633* (2013.01); *B60W 2710/0666* (2013.01); *B60W 2710/1005* (2013.01)

(58) Field of Classification Search
None
See application file for complete search history.

(56) References Cited

U.S. PATENT DOCUMENTS

| | | | |
|---|---|---|---|
| 5,023,792 A * | 6/1991 | Shioyama | B60K 31/107 180/179 |
| 5,795,262 A | 8/1998 | Robinson | |
| 6,411,881 B1 | 6/2002 | Thomas | |
| 6,881,170 B2 | 4/2005 | Onoyama et al. | |
| 8,121,772 B2 * | 2/2012 | Etori | B60W 30/16 180/169 |
| 8,157,705 B2 | 4/2012 | Yu et al. | |

(Continued)

OTHER PUBLICATIONS

Cunningham, Ralph Wayne, et al., "Powertrain Lash Management," U.S. Appl. No. 15/210,631, filed Jul. 14, 2016, 56 pages.

*Primary Examiner* — Justin Holmes
(74) *Attorney, Agent, or Firm* — Julia Voutvras; McCoy Russell LLP

(57) ABSTRACT

Systems and methods for reducing perception of transitions from shifting a transmission from neutral to drive are described. In one example, the transmission is shifted from neutral to drive in response to brake pedal motion before the brake pedal is fully released so that timing of pressurizing clutches and engaging a forward gear is advanced to occur while the brake pedal is still applied.

6 Claims, 5 Drawing Sheets

(56) References Cited

U.S. PATENT DOCUMENTS

| | | |
|---|---|---|
| 8,214,112 B2 | 7/2012 | Rew et al. |
| 9,291,118 B2 | 3/2016 | Kokon |
| 2008/0242502 A1* | 10/2008 | Lin .................... B60W 10/023 477/80 |
| 2010/0191446 A1 | 7/2010 | McDonald et al. |
| 2011/0071741 A1 | 3/2011 | Lochocki, Jr. et al. |
| 2012/0283922 A1 | 11/2012 | Phillips et al. |
| 2013/0297124 A1 | 11/2013 | Be et al. |
| 2014/0116179 A1* | 5/2014 | Sata ....................... B60K 20/06 74/473.31 |
| 2014/0117677 A1* | 5/2014 | Fukuzawa ............. B60W 10/26 290/40 F |
| 2015/0019097 A1* | 1/2015 | Morisaki .................. B60L 7/18 701/70 |

* cited by examiner

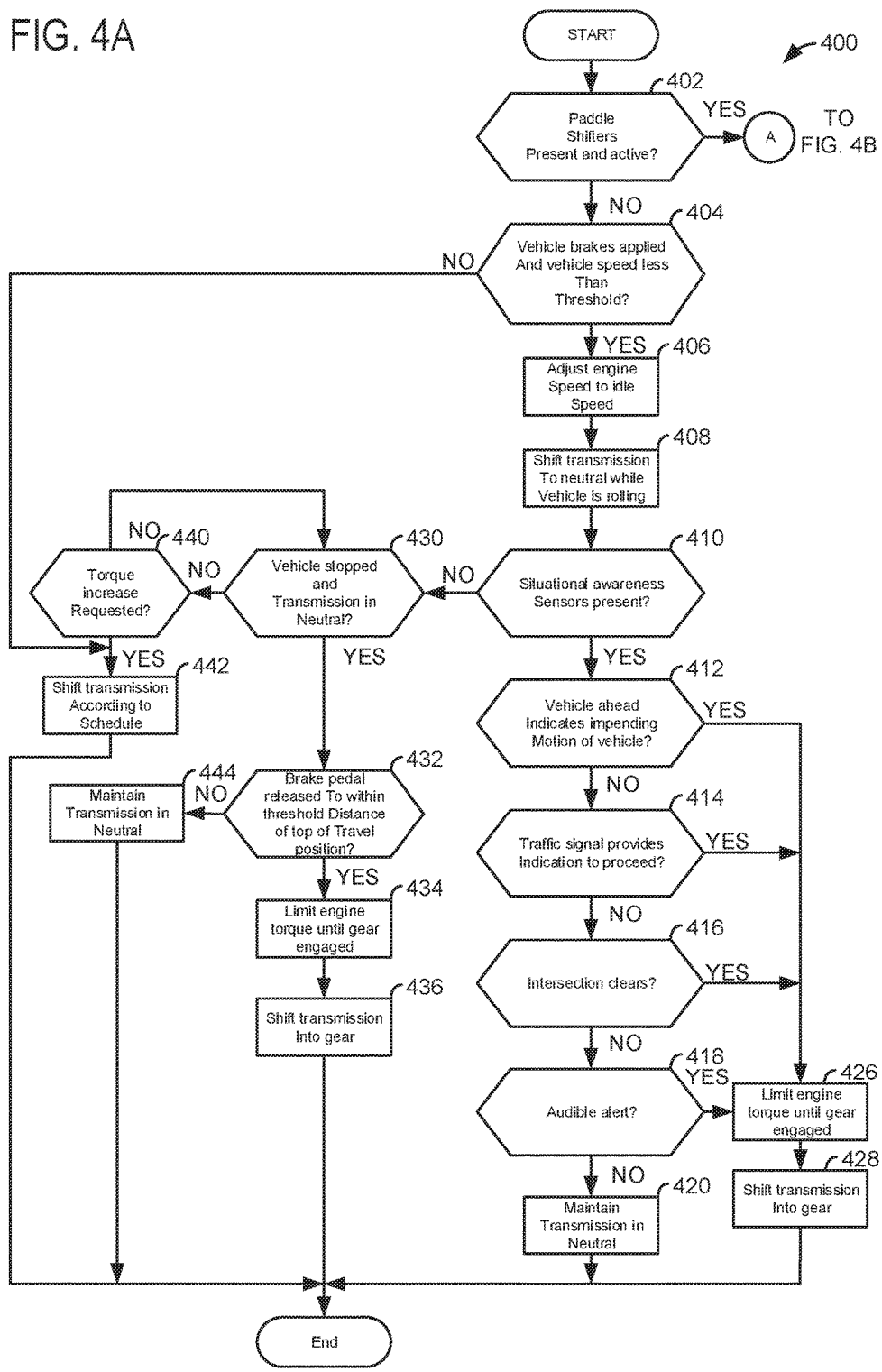

METHODS AND SYSTEM FOR OPERATING A VEHICLE

FIELD

The present description relates to methods and a system for operating a vehicle that includes an automatic transmission or an automatic transmission that may be shifted via manual inputs. The methods and systems may be particularly useful to conserve fuel during periods when driver demand torque is low.

BACKGROUND AND SUMMARY

A vehicle's engine may be stopped when the vehicle stops to conserve fuel. If the vehicle's driver or controller requests torque, the engine may be restarted to provide motive force for the vehicle. In this way, fuel may be conserved when little torque is requested to propel the vehicle. However, frequently starting and stopping the vehicle's engine main increase the possibility of starter degradation. Further, if an amount of requested torque is increased while the engine is stopped, a significant delay period may transpire before torque is made available to meet the torque request. Another way to increase fuel economy during low torque demand conditions is to shift a transmission that is coupled to the engine into neutral. Shifting the transmission into neutral lowers the load that the transmission applies to the engine. However, if the driver requests an increase in engine torque, a driveline torque disturbance (e.g., a "clunk") may be observed by the vehicle's occupants when the transmission is shifted back into gear. The "clunk" may be caused by clearances between transmission torque transferring components. For example, applying engine torque to the transmission may remove space between gear teeth (e.g., gear lash) which causes impact between gear teeth. It may be desirable to provide a way of conserving fuel during low torque demand conditions while reducing the possibility of disturbing vehicle occupants when additional torque is requested.

The inventors herein have recognized the above-mentioned issues and have developed a driveline operating method, comprising: shifting a transmission into neutral from a forward gear via a controller in response to vehicle speed being less than a threshold and a brake pedal being applied; and shifting the transmission into a forward gear via the controller in response to the brake pedal being released to a position within a threshold distance of top of brake pedal travel.

By shifting a transmission from neutral to a forward gear before a brake pedal is fully released, the technical result of reducing "clunk" and being ready for an increase in requested torque may be provided. In particular, shifting from neutral to a forward gear while the brake pedal is partially applied may prevent space between gear sets from opening so that impact between gear sets during shifting may be reduced. Further, the brake pedal position may be used as an indicator of an impending vehicle launch so that the transmission may be engaged in a forward gear at the time an increase in torque is requested. As a result, engine torque may be delivered to vehicle wheels through the transmission almost as soon as it is requested. In addition, situational awareness sensors and paddle shifting switches may also provide information that indicates an impending increase in engine torque. The transmission may also be shifted from neutral to a forward gear based on these inputs.

The present description may provide several advantages. In particular, the approach may reduce driveline torque disturbances. Further, the approach may improve vehicle drivability and fuel economy. Additionally, the approach may provide driving options that heretofore have not been available.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 4A and 4B describe a method for operating a vehicle.

DETAILED DESCRIPTION

Figure 1:
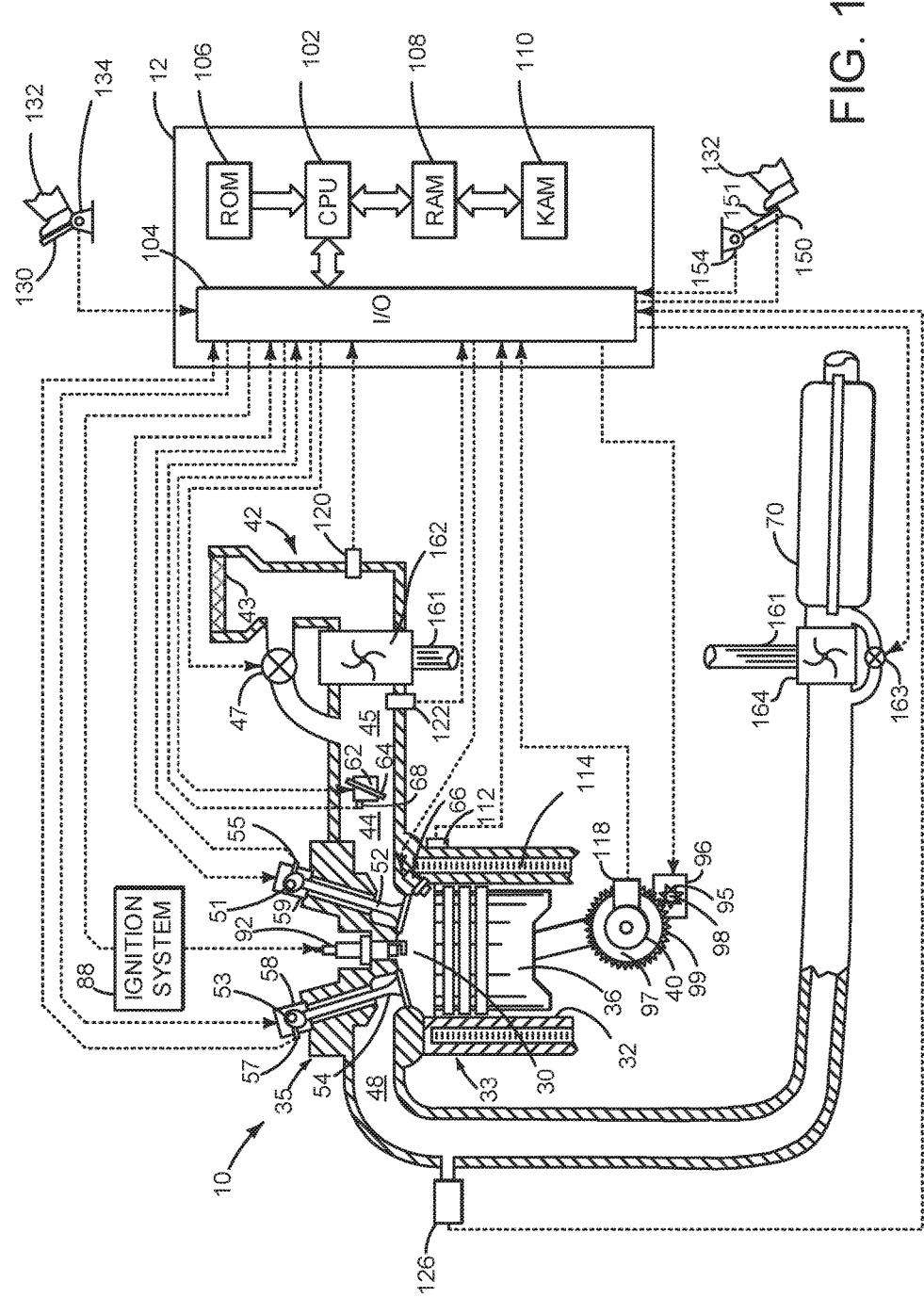
FIG. 1 is a schematic diagram of an engine.

The present description is related to conserving fuel during a period of a low demand torque request and improving vehicle launching (e.g., acceleration from zero or creep speed to a higher vehicle speed). A vehicle may include an engine as shown in FIG. 1. The engine of FIG. 1 may be included in a driveline shown in FIG. 2. The system of FIGS. 1 and 2 may provide the operating sequence shown in FIG. 3. The method of FIGS. 4A and 4B may be included in the system of FIGS. 1 and 2 to provide the operating sequence illustrated in FIG. 3.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42. Compressor bypass valve 47 may be selectively opened to reduce pressure across compressor 162.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver 132; a position sensor 154 coupled to brake pedal 150 for sensing force applied by driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 112 may also provide feedback to driver 132 via haptic actuator 151. In one example, haptic actuator 151 may vibrated at different frequencies based on output from controller 12 or another controller in the vehicle.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
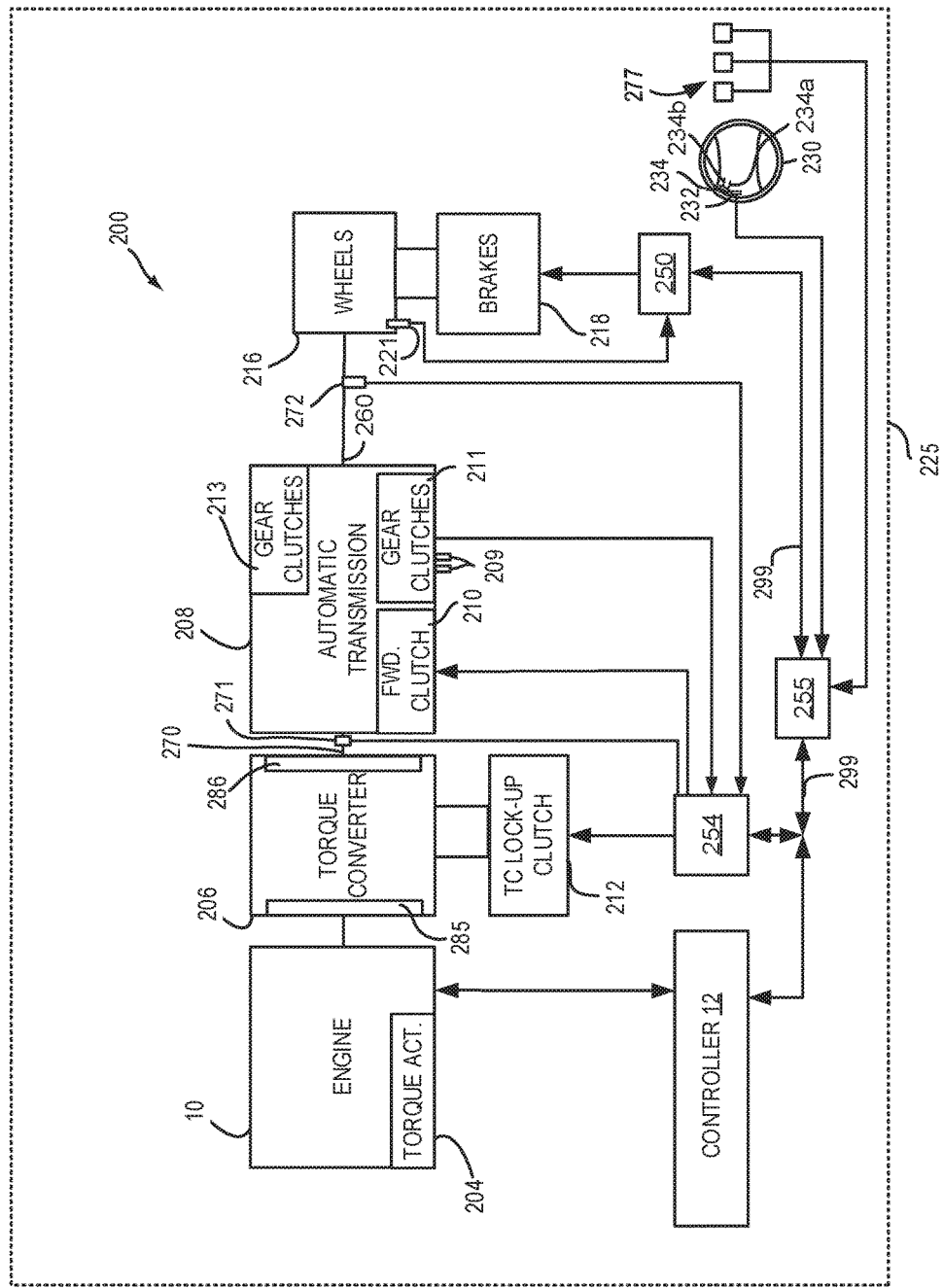
FIG. 2 is a schematic diagram of a vehicle driveline.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, transmission controller 254, and brake controller 250 to achieve driver input requests and other requests that are based on vehicle operating conditions.

In other examples, the partitioning of controlling powertrain devices may be partitioned differently than is shown in FIG. 2. For example, a single controller may take the place of vehicle system controller 255, engine controller 12, transmission controller 254, and brake controller 250. Alternatively, the vehicle system controller 255 and the engine controller 12 may be a single unit while the transmission controller 254, and the brake controller 250 are standalone controllers.

In this example, powertrain 200 may be powered by engine 10. Further, torque of engine 10 may be adjusted via torque actuator 204, such as a fuel injector, throttle, etc. An engine output torque may be transmitted to impeller 285. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210 for activating gears 213 (e.g., gears 1-10). Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates the requested driver demand torque to the engine. Vehicle system controller 255 requests the engine torque from engine controller 12. If engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed.

Accordingly, torque control of the various powertrain components may be supervised by vehicle system controller 255 with local torque control for the engine 10, transmission 208, and brakes 218 provided via engine controller 12, transmission controller 254, and brake controller 250.

As one example, an engine torque output may be controlled and/or limited by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to vehicle situational awareness sensors (e.g., cameras, microphones, and range detecting systems including radar, laser, and sonic transmitting and sensing devices), transmission hydraulic pressure sensors (e.g., gear clutch fluid pressure sensors), and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability.

System controller 255 also receives input from steering wheel 230. In particular, a driver may request that the transmission be upshifted or downshifted via shift paddles 232 and 234. The transmission may be upshifted when a driver depresses upshifter paddle 234. In one example, upshift paddle 234 includes first switch 234a that indicates half way application of upshift paddle 234 and second switch 234b that indicates full application of upshifter paddle 234. Switches 234a and 234b may close when upshift paddle 234 is applied. Switches 234a and 234b may be open when upshift paddle 234 is not applied. The driver may request a downshift when downshift paddle 323 is applied.

Thus, the system of FIGS. 1 and 2 provides for a system, comprising: an engine; a transmission coupled to the engine; steering wheel paddle shifter switches; and a controller including executable instructions stored in non-transitory memory to shift the transmission into neutral from a forward gear in response to vehicle speed being less than a threshold and a first driver input to the steering wheel paddle shifter switches, and executable instructions to shift the transmission from neutral to a forward gear in response to a second driver input to the steering wheel paddle shifter switches. The system further comprises additional instructions to limit engine torque while the transmission is shifted from neutral to the forward gear in response to the second driver input. The system further comprises additional instructions to limit engine torque while the transmission is shifted from neutral to the forward gear via limiting engine throttle opening. The system includes where the second driver input is a request to upshift the transmission. The system includes where the first driver input is a request to downshift the transmission. The system further comprises additional instructions to limit engine torque while the transmission is shifted from neutral to the forward gear via limiting spark timing advance.

Figure 3:
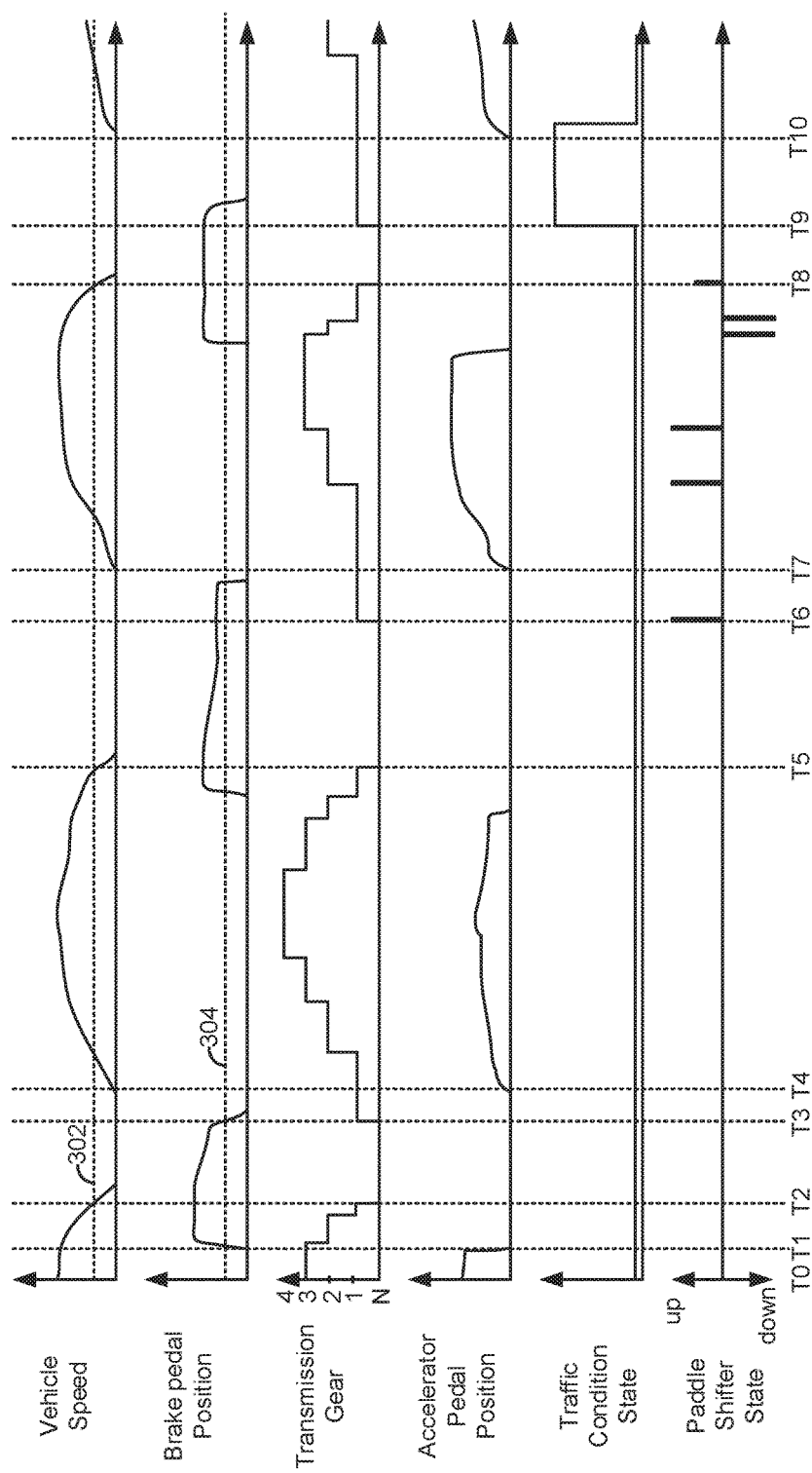
FIG. 3 shows an example prophetic operating sequence according to the method of FIGS. 4A and 4B.

Referring now to FIG. 3, example plots of a vehicle operating sequence are shown. The operating sequence may be performed via the system of FIGS. 1 and 2 in cooperation with the method of FIGS. 4A and 4B. Vertical lines at times T0-T10 represent times of interest during the sequence. The plots in FIG. 3 are time aligned and occur at the same time.

The first plot from the top of FIG. 3 is a plot of vehicle speed versus time. The vertical axis represents vehicle speed and vehicle speed increases in the direction of the vertical axis arrow. The horizontal axis represents time and time increases from the left side of the figure to the right side of the figure. Horizontal line 302 represents a threshold vehicle speed below which the transmission may be shifted into neutral.

The second plot from the top of FIG. 3 is a plot of brake pedal position versus time. The brake pedal is applied further when the trace is near the vertical axis arrow. The brake pedal is fully released (e.g., at its top of travel or base position) when the trace is at the level of the horizontal axis or not visible. Horizontal line 304 represents a threshold brake pedal position where the transmission may be shifted from neutral to a forward gear. Thus, if the trace is moves from above line 304 to below line 304 the brake pedal is being at least partially released and the transmission may be shifted into a forward gear from neutral when threshold 304 is crossed.

The third plot from the top of FIG. 3 is a plot of activated transmission gear versus time. The trace indicates which transmission gear is activated or of the transmission is in neutral. A particular gear is activated (e.g., engaged) when the trace is at the level of the gear indicated along the vertical axis. The transmission is in neutral when the trace is at the level of the horizontal axis (not visible). The horizontal axis represents time and time increases from the left side of the figure to the right side of the figure.

The fourth plot from the top of FIG. 3 is a plot of accelerator pedal position versus time. The vertical axis represents accelerator pedal position and accelerator pedal is applied a greater amount when the trace is at a higher level near the vertical axis arrow. The accelerator pedal position may be converted into a demand torque (e.g., a driver demand torque) via a transfer function that is indexed by accelerator pedal position and vehicle speed. The horizontal axis represents time and time increases from the left side of the figure to the right side of the figure.

The fifth plot from the top of FIG. 3 is a plot of traffic condition state. When the trace is at a higher level near the vertical axis arrow, the traffic condition state is indicating that situational awareness sensors indicate an impending or forecast increase in driver demand torque and vehicle launch. One the other hand, when the trace is near the horizontal axis, the trace indicates that situational awareness sensors do not indicate an impending or forecast increase in driver demand torque. The horizontal axis represents time and time increases from the left side of the figure to the right side of the figure.

The sixth plot from the top of FIG. 3 is a plot of paddle shifter switch state versus time. The paddle shifter switch indicates a request by the driver to upshift (e.g., enter a higher numerical gear) when the trace is above the horizontal axis. The paddle shifter switch indicates a request by the driver to downshift (e.g., enter a lower numerical gear) when the trace is below the horizontal axis. The horizontal axis represents time and time increases from the left side of the figure to the right side of the figure.

At time T0, vehicle speed is at a middle level and the accelerator pedal is applied. The brake pedal is not applied and the transmission is engaged in third gear. Traffic condition state is not asserted and the paddle shifters are not activated. These conditions may be present when a vehicle is traveling along a road.

At time T1, the driver (not shown) releases the accelerator pedal and the vehicle speed begins to be reduced in response to torque not being requested by the driver via the accelerator pedal. The traffic condition state is not asserted and the paddle shifters are not activated. Shortly after time T1, the brake pedal is applied and the transmission downshifts from third gear to second gear in response to driver demand torque and vehicle speed.

Between time T1 and time T2, the vehicle continues to decelerate and the transmission is downshifted as the vehicle decelerates. The accelerator pedal is not applied and the vehicle brakes are applied. The traffic condition state is not asserted and the paddle shifters are not activated.

At time T2, the vehicle speed is equal to threshold 302. The transmission is shifted from first gear to neutral in response to the brake pedal being applied and vehicle speed being less than or equal to threshold 302. The accelerator pedal is not applied and the traffic condition state is not asserted. The paddle shifters are not activated. The vehicle stops moving shortly after time T2.

At time T3, the driver (not shown) releases the brake pedal to level 304. The transmission is upshifted from neutral to first gear based on the brake pedal indicating an impending vehicle launch and acceleration. Engaging first gear before the accelerator pedal is applied and while the brake pedal is still applied may hold gear teeth together to eliminate clunk during vehicle launch. Further, first gear may be completely engaged so that slippage of the first gear clutch may be reduced when the driver applies the accelerator pedal. Thus, engaging first gear early before the accelerator pedal is applied may improve vehicle launch and reduce the possibility of transmission degradation.

At time T4, the driver (not shown) applies the accelerator pedal to increase the demand torque or driver demand torque. The vehicle begins to accelerate and the paddle shifters are not activated. The transmission is an automatic transmission so it may shift automatically when not manually requested to shift via the paddle shifters. In one example, a switch or pushbutton may activate the paddle shifters.

In this way, the transmission is shifted from neutral to first gear in response to the brake pedal being partially released. This operating mode allows the driver to decide when it is desirable to enter first gear to improve vehicle launch after the transmission has automatically entered neutral based on vehicle speed and brake pedal position by selectively changing the position of the brake pedal.

Between time T4 and time T5, the accelerator pedal position is adjusted by the driver (not shown). The transmission automatically shifts gears responsive to vehicle speed and accelerator pedal position or demand torque. The paddle shifters are not activated and the traffic condition state is not asserted. The brakes are not applied until near time T5 and the vehicle accelerates and decelerates based on the accelerator pedal position.

At time T5, the vehicle speed is equal to threshold 302 and the vehicle brakes are applied. The transmission is downshifted to neutral in response to the vehicle brakes being applied and the vehicle speed being equal to or less than threshold 302. The accelerator pedal is not applied and the traffic condition state is not asserted. The vehicle stops shortly after time T5.

At time T6, the paddle shifters are activated and the driver requests an upshift while the vehicle brakes are applied. The driver (not shown) may request an upshift out of neutral and into first gear in response to conditions that the driver observes. For example, the driver may request an upshift in response to cross traffic in front of the vehicle stopping or a traffic light changing from red to green. The transmission shifts from neutral to first and while the brake is applied. Consequently, gear teeth in the driveline may remain in contact so that clunk caused by shifting from neutral to first may be reduced.

At time T7, the driver applies the accelerator pedal while the transmission is engaged in first gear. The vehicle begins to accelerate in response to the accelerator pedal position and the traffic condition state is not asserted.

Thus, in this vehicle launch example, the transmission is shifted from neutral to first gear in response to paddle shifter input. This mode allows the driver to decide when it is desirable to enter first gear to improve vehicle launch after the transmission has automatically entered neutral based on vehicle speed and brake pedal position.

Between time T7 and time T8, the vehicle accelerates and the transmission is upshifted and downshifted based on driver inputs to the paddle shifters. The brake pedal is not applied until near time T8. The accelerator pedal is applied and then released before the vehicle brakes are applied. The traffic condition state is not activated.

At time T8, the vehicle speed is less than or equal to level 302 and the driver requests that the transmission shifts from first gear to neutral to conserve fuel. The transmission shifts in response to the paddle shifter input. In this example, the driver shifts to neutral by imputing a half scale input into the upshift paddle shifter. The upshift paddle shifter may include two switches 234a and 243b shown in FIG. 2 that are closed when the upshift paddle shifter is fully applied. If the upshift paddle shifter is applied part way (e.g., half way) only one of the two switches closes. The controller shifts to neutral only when the transmission is in first gear and when only one of the two upshift switches is closed. In other examples, the controller may shift to neutral when a downshift from first gear is requested via applying the downshift paddle. In still other examples, neutral may be requested via up and down shift paddles via simultaneously applying both up and down shift paddles at a same time while the transmission is in first gear. The vehicle brakes are applied and the accelerator pedal is not applied. The traffic condition state is not asserted. The vehicle comes to a full stop shortly after time T8.

At time T9, the traffic condition state is asserted in response to output of one or more of the vehicle's situational awareness sensors. For example, a traffic light may change from red to green which causes the traffic condition state to be asserted. The driver releases the vehicle brake after time T9. The transmission is engaged in first gear and the paddle shifters are not activated. The vehicle speed remains zero.

At time T10, the driver applies the accelerator pedal and the vehicle begins to accelerate. The traffic condition remains asserted until the vehicle begins to accelerate and then it transitions to not asserted in response to the vehicle traveling. The brake pedal is not applied and the paddle shifters are not activated.

Thus, the transmission may be automatically shifted from neutral to first gear in response to traffic conditions after the transmission was automatically (e.g., without the driver specifically requesting transmission shifting via a shift selector) shifted into neutral. This mode may reduce the attention used by a driver to conserve fuel.

Figure 4B:
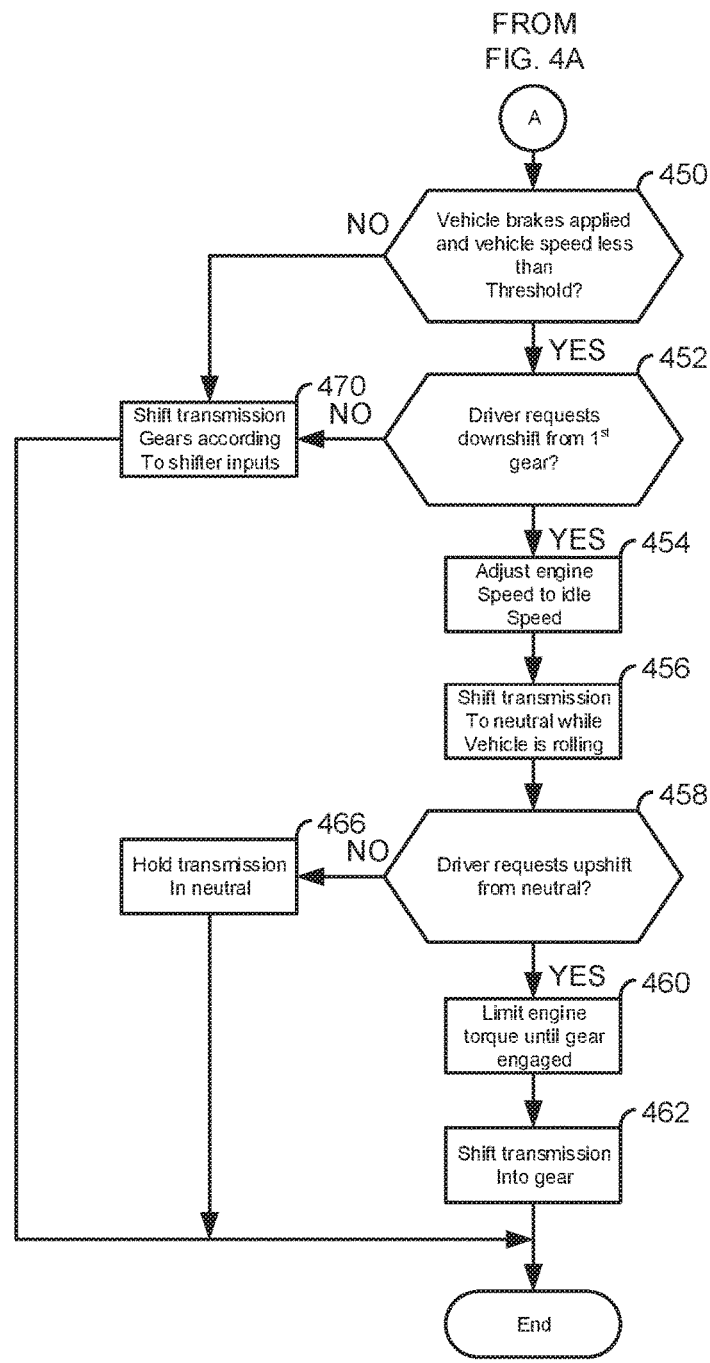

Referring now to FIGS. 4A and 4B, an example flow chart for a method for operating a vehicle driveline is shown. The method of FIGS. 4A and 4B may be incorporated into and may cooperate with the system of FIGS. 1 and 2. Further, at least portions of the method of FIGS. 4A and 4B may be incorporated as executable instructions stored in non-transitory memory while other portions of the method may be performed via a controller transforming operating states of devices and actuators in the physical world.

At 402, method 400 judges if transmission paddle shifters are present and active. Paddle shifters may be activated via a pushbutton or other human/machine interface. If method 400 judges that paddle shifters are present and active, the answer is yes and method 400 proceeds to 404. Otherwise, the answer is no and method 400 proceeds to 450.

At 404, method 400 judges if vehicle brakes are applied and vehicle speed is less than a threshold speed. In one example, vehicle brakes may be determined to be activated based on a position of a brake pedal switch. Vehicle speed may be determined via a vehicle speed sensor. If method 400 judges that vehicle brake are applied and vehicle speed is less than a threshold, the answer is yes and method 400 proceeds to 406. Otherwise, the answer is no and method 400 proceeds to 442.

At 406, method 400 adjusts engine speed to a base engine idle speed. The base engine idle speed may be a speed the engine is idled at when the engine is at its warmed-up nominal operating temperature. The engine may be operated in a speed control mode where engine torque is increased or decreased to maintain a desired engine speed (e.g., the base engine idle speed). Method 400 proceeds to 408.

At 408, method 400 shifts the transmission from a higher forward gear (e.g., first gear) into neutral. The transmission is shifted without the driver providing input to a shift selector. Method 400 proceeds to 410.

At 410, method 400 judges if situational awareness sensors (e.g., cameral, microphone, laser, radar, or sonic sensors) are present. In one example, bits in memory may hold values that indicate the vehicle configuration and the presence or absence of situational awareness sensors. If method 400 judges that situational sensors are present and active, the answer is yes and method 400 proceeds to 412. Otherwise, the answer is no and method 400 proceeds to 430.

At 412, method 400 judges if a vehicle ahead of the present vehicle indicates impending motion of the present vehicle. The vehicle ahead or in the path of the present vehicle may indicate impending motion of the present vehicle by its tail lights darkening (e.g., not being illuminated) or the vehicle ahead of the present vehicle moving forward. If method 400 judges that the vehicle ahead of the present vehicle indicates impending motion of the present vehicle, the answer is yes and method 400 proceeds to 426. Otherwise, the answer is no and method 400 proceeds to 414.

At 414, method 400 judges if a traffic signal indicates impending motion of the present vehicle. The traffic signal may indicate impending motion of the present vehicle by changing color (e.g., from red to green). If method 400 judges that the traffic signal indicates impending motion of the present vehicle, the answer is yes and method 400 proceeds to 426. Otherwise, the answer is no and method 400 proceeds to 416.

At 416, method 400 judges if traffic in front of the present vehicle indicates impending motion of the present vehicle. The traffic in front of the present vehicle may indicate impending motion of the present vehicle by clearing an intersection. If method 400 judges that the traffic indicates impending motion of the present vehicle, the answer is yes and method 400 proceeds to 426. Otherwise, the answer is no and method 400 proceeds to 418.

At 418, method 400 judges if an audible signal or alert indicates impending motion of the present vehicle. In one example, the audible signal or alert may be the sound of a vehicle horn behind the present vehicle. The sound of a horn behind the present vehicle may indicate that the driver of the present vehicle is not timely responding to traffic conditions. It may be expected that the driver will intend on driving away in response to the audible alert. If method 400 judges that an audible alert indicates impending motion of the present vehicle, the answer is yes and method 400 proceeds to 426. Otherwise, the answer is no and method 400 proceeds to 420.

At 420, method 400 holds or maintains the transmission in neutral to conserve fuel. The vehicle may be maintained in neutral via depressurizing one or more transmission gear clutches so that the transmission's input shaft is not mechanically linked to the transmission's output shaft. Method 400 proceeds to exit.

At 426, method 400 limits engine torque provided to the transmission. In one example, an opening amount of the engine throttle may be limited while the vehicle is in neutral and while the transmission is shifting from neutral to a forward gear so that transmission clutch slippage and/or the possibility of transmission degradation is reduced. Engine torque may also be limited via limiting spark timing advance, fuel injection amount, and camshaft timing. Method 400 proceeds to 428.

At 428, method 400 shifts into a forward gear from neutral. The transmission may be shifted into a forward gear (e.g., first gear) via closing one or more clutches. Method 400 then proceeds to exit.

At 430, method 400 judges if the present vehicle is stopped and the transmission is in neutral. Method 400 may judge that the vehicle is stopped based on output of the vehicle speed sensor. Method 400 may judge that the vehicle's transmission is in neutral based on values of one or more variables stored in memory. If method 400 judges that the vehicle is stopped and the transmission is in neutral, the answer is yes and method 400 proceeds to 432. Otherwise, the answer is no and method 400 proceeds to 440.

At 432, method judges if the brake pedal is released to within a threshold distance of its top of travel position. The top of travel position may be a position of the brake pedal when it is fully released by a driver. The brake pedal position may be determined via a brake pedal position sensor. If method 400 judges that the brake pedal is released to within a threshold distance of its top of travel position, the answer is yes and method 400 proceeds to 434. Otherwise, the answer is no and method 400 proceeds to 444.

Additionally, method 400 may provide haptic feedback to the driver in response to the brake pedal position starting a shift from neutral to drive. Method 400 may also provide haptic feedback to the driver when the shift is complete. For example, method 400 may vibrate the brake pedal at a first frequency in response to initiating the shift into first gear. Method 400 may vibrate the brake pedal at a second frequency in response to the shift being complete.

At 444, method 400 holds or maintains the transmission in neutral to conserve fuel. The vehicle may be maintained in neutral via depressurizing one or more transmission gear clutches so that the transmission's input shaft is not mechanically linked to the transmission's output shaft. Method 400 proceeds to exit.

At 434, method 400 limits engine torque provided to the transmission. In one example, an opening amount of the engine throttle may be limited while the vehicle is in neutral and while the transmission is shifting from neutral to a forward gear so that transmission clutch slippage and/or the possibility of transmission degradation is reduced. Engine torque may also be limited via limiting spark timing advance, fuel injection amount, and camshaft timing. Method 400 proceeds to 436.

At 436, method 400 shifts into a forward gear from neutral. The transmission may be shifted into a forward gear (e.g., first gear) via closing one or more clutches. Method 400 then proceeds to exit.

At 440 method 400 judges if an increase in engine torque is requested via a driver. Method 400 may judge that a torque increase is requested by a driver when the driver depresses an accelerator pedal. If method 400 judges that a torque increase is requested, the answer is yes and method 400 proceeds to 442. Otherwise, the answer is no and method 400 returns to 430.

At 442, method 400 shifts the transmission according to a transmission shift schedule. In one example, the transmission is automatically shifted according to a shift schedule that shifts transmission gears based on vehicle speed and accelerator pedal position. Method 400 proceeds to exit after shifting the transmission.

At 450, method 400 judges if vehicle brakes are applied and vehicle speed is less than a threshold speed. Vehicle brakes may be determined to be activated based on a position of a brake pedal switch. Vehicle speed may be determined via a vehicle speed sensor. If method 400 judges that vehicle brake are applied and vehicle speed is less than a threshold, the answer is yes and method 400 proceeds to 452. Otherwise, the answer is no and method 400 proceeds to 470.

At 452, method 400 judges whether or not a driver requests a downshift from first gear to neutral. In one example, the driver may request a downshift via paddle shifters. If method 400 judges that a downshift is requested, the answer is yes and method 400 proceeds to 454. Otherwise, the answer is no and method 400 proceeds to 470.

At 470, method 400 shifts the transmission gears according to paddle shifter inputs. For example, if the driver requests an upshift, the transmission is upshifted. If the driver requests a downshift, the transmission is downshifted. Method 400 proceeds to exit after transmission gears are shifted.

At 454, method 400 adjusts engine speed to a base engine idle speed. The base engine idle speed may be a speed the engine is idled at when the engine is at its warmed-up nominal operating temperature. The engine may be operated in a speed control mode where engine torque is increased or decreased to maintain a desired engine speed (e.g., the base engine idle speed). Method 400 proceeds to 456.

At 456, method 400 shifts the transmission from a higher forward gear (e.g., first gear) into neutral. The transmission is shifted based on the driver providing input to a shift selector. Method 400 proceeds to 458.

At 458, method 400 judges if a driver requests an upshift from neutral. The driver may request an upshift via paddle shifters and method 400 may judge an upshift is requested based on a position of the paddle shifters. If method 400 judges that the driver requests an upshift, the answer is yes and method 400 proceeds to 460. Otherwise, the answer is no and method 400 proceeds to 466.

At 466, method 400 holds or maintains the transmission in neutral to conserve fuel. The vehicle may be maintained in neutral via depressurizing one or more transmission gear clutches so that the transmission's input shaft is not mechanically linked to the transmission's output shaft. Method 400 proceeds to exit.

At 460, method 400 limits engine torque provided to the transmission. In one example, an opening amount of the engine throttle may be limited while the vehicle is in neutral and while the transmission is shifting from neutral to a forward gear so that transmission clutch slippage and/or the possibility of transmission degradation is reduced. Engine torque may also be limited via limiting spark timing advance, fuel injection amount, and camshaft timing. Method 400 proceeds to 462.

At 462, method 400 shifts into a forward gear from neutral. The transmission may be shifted into a forward gear (e.g., first gear) via closing one or more clutches. Method 400 then proceeds to exit.

Thus, the method of FIG. 4 provides for a driveline operating method, comprising: shifting a transmission into neutral from a forward gear via a controller in response to vehicle speed being less than a threshold and a brake pedal being applied; and shifting the transmission into a forward gear via the controller in response to the brake pedal being released to a position within a threshold distance of top of brake pedal travel. The method further comprises providing haptic feedback to a driver that shifting the transmission into forward gear has commenced. The method further comprising providing haptic feedback to the driver that shifting the transmission into forward gear has been completed. The method includes where the transmission is an automatic transmission.

In some examples, the further comprises limiting engine torque to less than a threshold torque while the transmission is in neutral and before the forward gear is engaged. The method includes where the engine torque is limited via limiting an amount of air inducted to an engine. The method includes where top of brake pedal travel is a base brake pedal position when the brake pedal is fully released.

The method of FIG. 4 provides for a driveline operating method, comprising: shifting a transmission into neutral from a forward gear via a controller in response to vehicle speed being less than a threshold and a brake pedal being applied; and shifting the transmission into a forward gear via the controller in response to a vehicle situation awareness sensor indicating a clear travel path in front of a vehicle. The method includes where the situational awareness sensor is a camera. The method includes where the situational awareness sensor is a microphone. The method includes where the situational awareness sensor is a range detecting sensor. The method further comprises limiting engine torque to less than a threshold torque while the transmission is in neutral and before the forward gear is engaged. The method further comprises shifting the transmission into a forward gear via the controller in response to the brake pedal being released to a position within a threshold distance of top of brake pedal travel. The method includes where top of brake pedal travel is a base brake pedal position when the brake pedal is fully released.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A system, comprising:
   an engine;
   a transmission coupled to the engine;
   steering wheel paddle shifter switches; and
   a controller including executable instructions stored in non-transitory memory to shift the transmission into neutral from a forward gear in response to:
      vehicle speed being less than a threshold; and
      a first driver input to the steering wheel paddle shifter switches; and
   wherein the controller further comprises executable instructions to shift the transmission from neutral to a forward gear in response to a second driver input to the steering wheel paddle shifter switches.

2. The system of claim 1, further comprising additional instructions to limit engine torque while the transmission is shifted from neutral to the forward gear in response to the second driver input.

3. The system of claim 1, further comprising additional instructions to limit engine torque while the transmission is shifted from neutral to the forward gear via limiting engine throttle opening.

4. The system of claim 1, where the second driver input is a request to upshift the transmission.

5. The system of claim 1, where the first driver input is a request to downshift the transmission.

6. The system of claim 1, further comprising additional instructions to limit engine torque while the transmission is shifted from neutral to the forward gear via limiting spark timing advance.

\* \* \* \* \*